United States Patent [19]

Kaczmarczyk

[11] Patent Number: 4,984,958
[45] Date of Patent: Jan. 15, 1991

[54] CARRIER FRAME FOR A QUICK COUPLER

[75] Inventor: Edward T. Kaczmarczyk, Welland, Canada

[73] Assignee: Deere & Company, Moline, Ill.

[21] Appl. No.: 429,593

[22] Filed: Oct. 31, 1989

[51] Int. Cl.⁵ .............................................. E02F 3/00
[52] U.S. Cl. ......................................... 414/723; 403/2
[58] Field of Search ............... 414/723, 686; 172/271, 172/273, 816; 403/2, 378, 379

[56] References Cited

U.S. PATENT DOCUMENTS

| | | | |
|---|---|---|---|
| 1,744,536 | 1/1930 | Faverty | 172/271 |
| 3,503,455 | 3/1970 | Derman | 172/271 |
| 4,135,584 | 1/1979 | Smith et al. | 172/816 X |
| 4,243,356 | 1/1981 | Takojima . | |
| 4,253,793 | 3/1981 | Braml | 172/273 X |
| 4,274,493 | 6/1981 | Freese | 172/816 |
| 4,436,477 | 3/1984 | Lenertz et al. . | |
| 4,761,113 | 8/1988 | Smith et al. . | |
| 4,812,103 | 3/1989 | Cochran et al. | 414/723 |

OTHER PUBLICATIONS

Deere 240 and 245 Farm Loaders Operator's Manual; OM-W28596 Issue B3; cover and p. 39.

Primary Examiner—Robert J. Spar
Assistant Examiner—Donald W. Underwood

[57] ABSTRACT

A quick attachment holder for connecting an attachment to the boom arms of a loader includes right-hand and left-hand end portions connected by a semi-rigid cross tube, without additional structural cross members. A pin connection of the holder end portions to the tube causes the left- and right-hand end portions to generally move together while permitting several degrees of relative rotational movement between end portions to aid in the reconnection of the attachment even when there is slight misalignment between the holder and the attachment. The cross tube is located on the pivot center of the holder so that only torque loads are applied to the tube. The pin connection will shear if the tube is accidentally over-torqued, and individual components of the holder are replaceable.

19 Claims, 4 Drawing Sheets

CARRIER FRAME FOR A QUICK COUPLER

BACKGROUND OF THE INVENTION

1. Field of the Invention

The present invention relates generally to boom-mounted attachments such as front end loader buckets, and more specifically to an improved carrier frame for a coupling utilized to mount the attachment on the boom.

2. Related Art

Many types of structures are available to connect a bucket or other device to the forward end of loader arms. Typically the device either includes a standard semi-permanent mounting arrangement wherein pins or bolts are manually connected between the arms and the attachment, or a relatively complex and more expensive quick coupler located on the arms and latchable automatically during mounting of the attachment. Making the necessary connections and disconnections during mounting and dismounting of the standard arrangement can be time-consuming and inconvenient.

To speed mounting and dismounting of the attachment, various types of quick coupling devices have been made available which reduce the number of times the operator has to leave the operator station during the procedures. Examples of such devices which typically include right-hand and left-hand mounting portions tied together by a large, rigid frame member are shown in U.S. Pat. No. 4,545,720; 3,876,091; 3,672,521 and 3,204,793. The frame member in the past has been made relatively strong and heavy since any distortion of the coupling would make connection of the attachment virtually impossible. The frame member keeps the right- and left-hand mounting portions fixed with respect to each other with very close tolerances, thereby resulting in manufacturing difficulties and high costs. The size and weight make the frame member difficult to handle and ship, and if the member is damaged complete replacement is often necessary. Although lighter frame members such as shown is U.S. Pat. No. 4,243,356 have been suggested, the connecting rod joining the end portions is subject to bending moments that can easily damage the structure.

BRIEF SUMMARY OF THE INVENTION

It is therefore an object of the present invention to provide an improved mounting structure for a loader attachment. It is a further object to provide such a structure which overcomes the aforementioned problems.

It is another object of the invention to provide an improved mounting structure for a loader attachment which is relatively light, inexpensive and easy to handle and ship. It is another object to provide such a mounting structure which facilitates connection of the attachment, even when the attachment is slightly misaligned with the mounting structure.

It is a further object of the invention to provide an improved mounting structure for a loader attachment quick coupler which eliminates large and expensive frame members. It is a further object to provide such a structure which has overload protection and is easily repairable. It is a further object to provide such a structure which does not require tight manufacturing tolerances and rigidity.

It is still another object to provide loader attachment mounting structure with a frame having a relatively small cross tube connecting the carrier end portions. It is another object to provide such a structure wherein the cross tube receives only torque loads with little or no bending moments.

It is yet another object of the invention to provide a relatively light and easily mountable attachment carrier for a loader. It is a further object to provide such a structure which facilitates use of either a quick attachment mounting or a more permanent conventional mounting with the pivot locations of the mountings remaining unchanged so that loader characteristics are unaltered with the different mountings.

In accordance with the above objects, a quick attachment holder for connecting an attachment to the boom arms of a loader includes right-hand and left-hand end portions connected by a semi-rigid cross tube, without additional structural cross members. Pin connections of the holder end portions to the tube causes the left- and right-hand end portions to generally move together while permitting several degrees of relative rotational movement to aid in the reconnection of the attachment even when there is slight misalignment between the holder and the attachment.

The semi-rigid tube is placed on the pivot center of the holder so that loading is primarily torsional with little or no bending moment applied to the tube. Therefore, the tube can be made substantially smaller than if located off the pivot center. If the tube is over-torqued for any reason, the pin connection will shear to prevent damage to the tube and to the remainder of the holder. If the holder is damaged, individual components can be replaced, eliminating the need and expense of replacing the entire holder. Shipping is simplified because the holder can be broken down and bundled. The holder obviates the need for tight tolerances and rigidity, and thereby results in reduced cost and ease of manufacture. The overall structure lends itself to easy conversion between a quick mount arrangement and a more permanent and less expensive conventional direct mount arrangement without having to change the basic attachment or the locations of the pivotal axes of the attachment so that the loader characteristics remain unaltered.

These and other objects, features and advantages of the present invention will become apparent to one skilled in the art upon reading the following detailed description in view of the drawings.

DETAILED DESCRIPTION OF THE DRAWINGS

Figure 1:
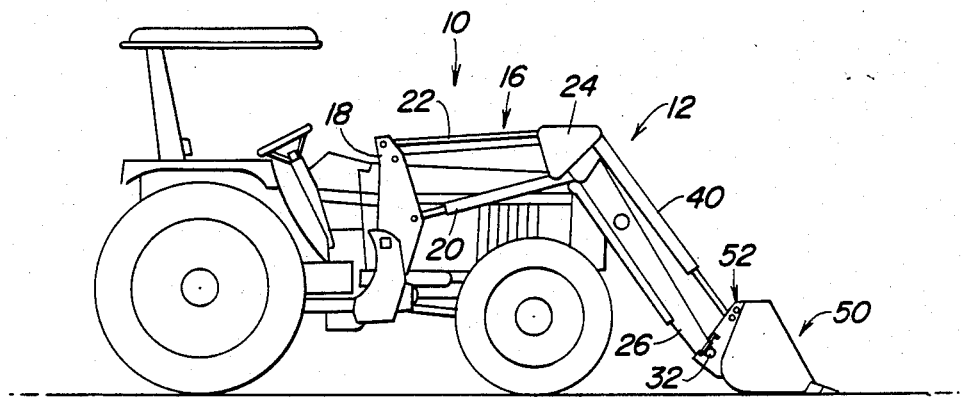
FIG. 1 is a side view of a tractor with a loader attached thereto on which the quick attachment carrier of the present invention is attached.
Figure 2:
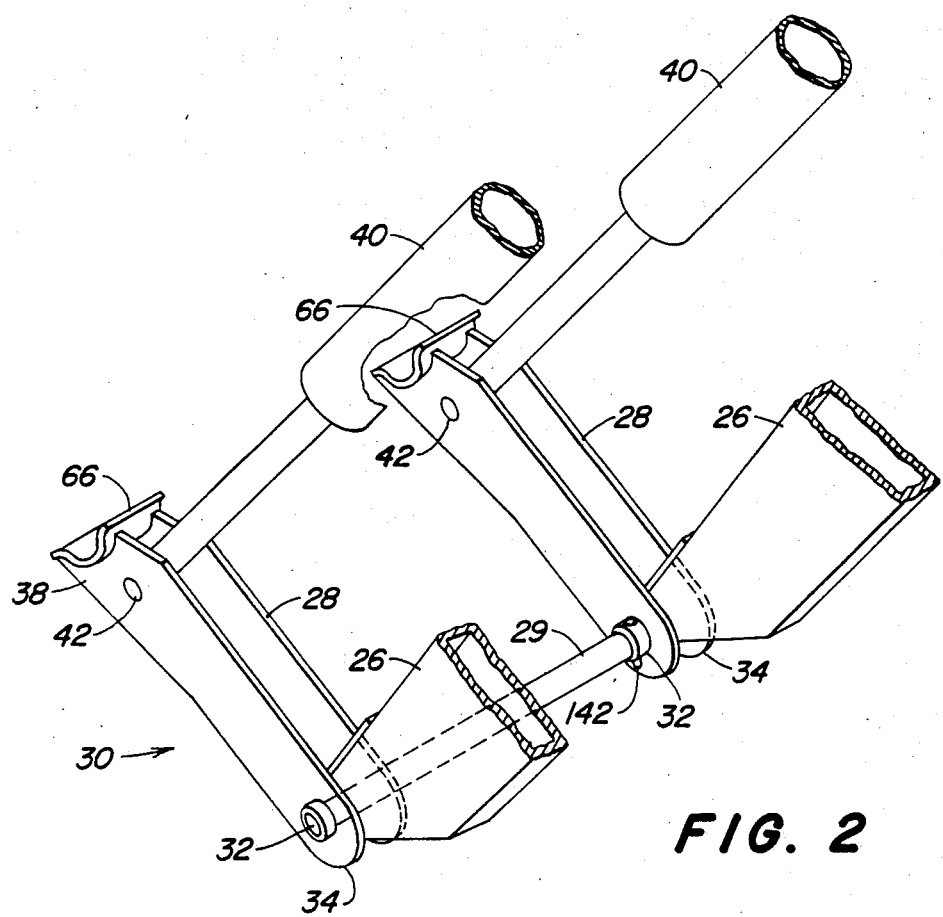
FIG. 2 is a perspective view of the front portion of the loader of FIG. 1 with the attachment removed and showing the carrier connected to the boom arms.
Figure 3:
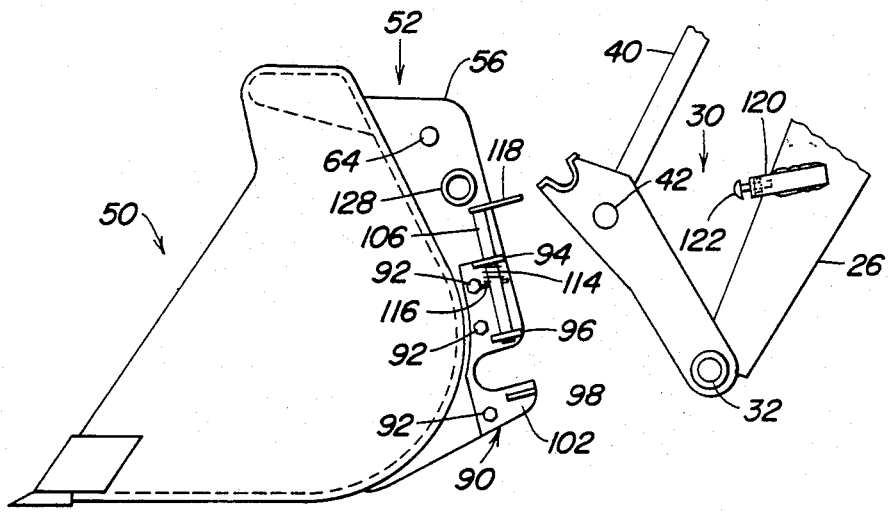
FIG. 3 is a side view showing the holder as it is moved into position adjacent the attachment.

Referring now to FIG. 1, therein is shown a tractor 10 having a loader 12 connected thereto. The loader 12 includes a mast 16 pivotally connected to upright mast posts 18 for rocking in a conventional manner about a transverse axis by boom cylinders 20. The mast includes a pair of transversely spaced boom arms 22 extending forwardly from the mast posts 18 to knee joints 24. The arms 22 extend downwardly from the joints 24 to a lower, forward attachment mounting ends 26. Attachment holder end portions 28 (FIG. 2) are connected at the opposite ends of a semi-rigid cross tube 29 to define an attachment carrier indicated generally at 30. The left- and right-hand end portions are pivotally connected to the respective arm ends 26 for rocking about an axis corresponding to the axis of the tube 29. A transversely extending pivot or bushing 32 projects outwardly from each side of the boom arm 22. The holder end portion 28 is channel-shaped and has a lower end 34 opening about the boom arm end 26. Each holder end portion 28 extends upwardly from the pivotal connection with the end 26 to an upper holder portion or saddle 38. The rod end of a corresponding attachment cylinder 40 is pivotally connected to the portion 38 at a pivot location 42 above the pivot 32. Actuation of the cylinders 40 rocks the attachment holder end portions 28 about the axis of the tube 29 to control the attitude of the carrier 30 and any attachment connected thereto. The tube 29 allows the left- and right-hand portions 28 of the carrier 30 to be in sequence but also have several degrees of rotational movement relative to each other to aid in connecting the attachment. Since the tube 29 is on the pivot center of the carrier 30, only torsional loading is applied to the tube with virtually no bending moments, and, as a result, a tube of relatively small cross section is used. A more detailed description of the attachment carrier 30 is given below.

As shown in the Figures, the loader 12 is a front end loader, and the attachment is a loader bucket 50. However, it is to be understood that the present invention may be used with other types of attachments which are mounted on a boom.

THE ATTACHMENT MOUNTING STRUCTURE

The attachment or bucket 50 includes mounting structure indicated generally at 52 adapted for mating with the attachment carrier 30 for firm support on the boom arms 22. The mounting structure 52 includes a pair of transversely spaced upright mounting brackets 56 fixed to the rear wall of the bucket 50. Each bracket 56 includes two transversely spaced plates which open rearwardly for receiving the corresponding attachment holder end portion 28. Near the top of each bracket 56, a pin 64 extends transversely between the plates. The top of each holder end portion 28 includes an upwardly opening U-shaped support surface or saddle 66 adapted for engaging the lower portion of the pin 64 during mounting (FIG. 4) of the attachment. The surface 66 diverges in the upward direction to help guide the pin 64 to the proper location as the holder end portion 28 is positioned within the bracket 56 during mounting.

Figure 4:
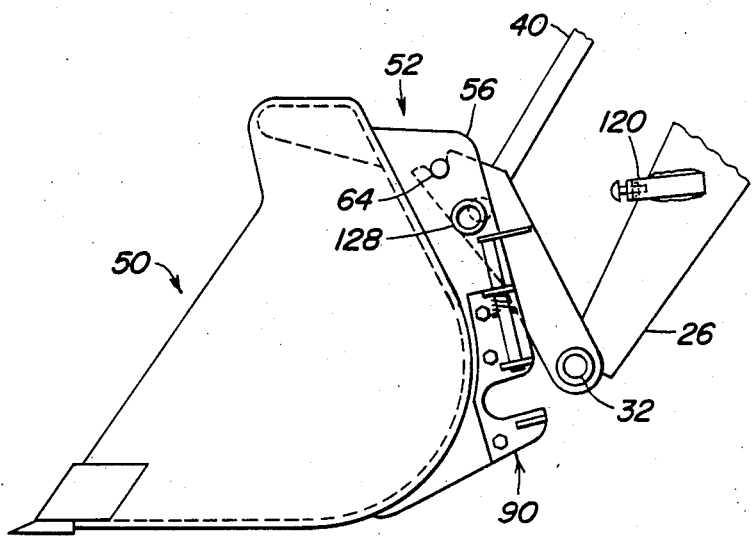
FIG. 4 is a view similar to FIG. 3 but showing the carrier as the holder saddles move into contact with the attachment.
Figure 5:
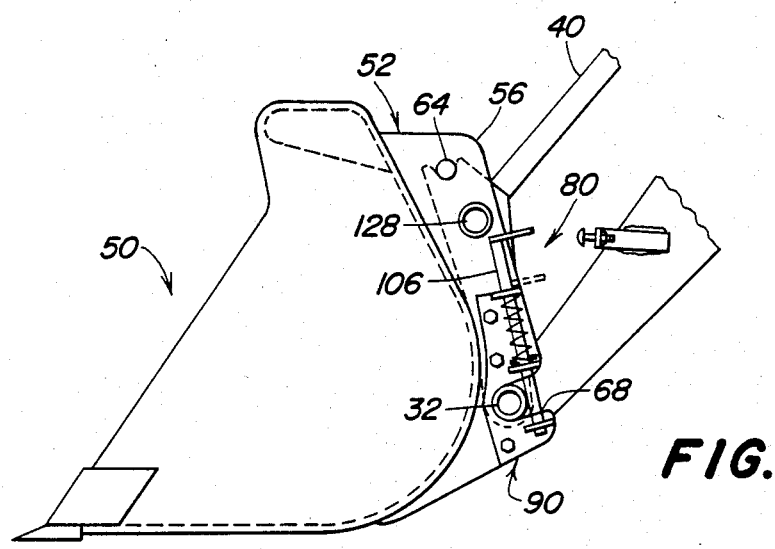
FIG. 5 is a view similar to FIGS. 3 and 4 but showing the carrier pivoted back.

Rearwardly opening slots 68 located at the lower portions of the respective brackets 56 are adapted to receive the corresponding transversely extending portions of the lower pivots 32 as the holder end portions 28 are rolled back from the position shown in FIG. 4 to the position shown in FIG. 5. Retaining structure indicated generally at 80 in FIG. 5 is connected to the attachment brackets 56 for automatically locking the attachment to the boom as the pivots 32 as the pivots move into the bracket slots 68.

As seen in FIGS. 3–6, the retaining structure 80 includes a quick coupling device 90 bolted to the inner plate of each bracket 56 by bolts 92. The device 90 includes an upper support member 94, an intermediate support member 96 and a lower support member 98 connected to a base plate 102 which, in turn, is fixed to the bracket 56 by the bolts 92. The intermediate and lower support members 96 and 98 are offset on opposite sides of the slot 68 and a corresponding slot 104 in the base plate 102. An additional hole location is provided near the upper support member 94 for a third bolt 92.

Figure 6:
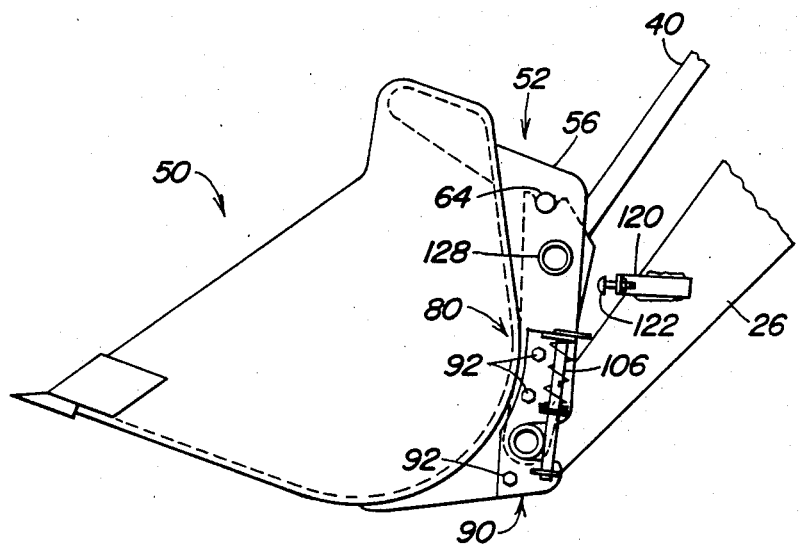
FIG. 6 is a view similar to FIG. 5 but showing the attachment rolled back to trip the latching pins on the quick coupling.

The support members 94, 96, and 98 are aligned in the upright direction and include aligned square apertures which slidingly receive a square locking pin 106 which is movable vertically between an upper release position (FIGS. 3–5) and a tripped or lower locking position (FIG. 6). The locking pin 106 includes a central portion having a rearwardly opening notch which rests against the upper member 94 when the pin 106 is in the release position. A coil spring 114 encircles the pin 106 and is compressed between a spring-retaining pin 116 and the bottom of the member 94 for biasing the pin 106 toward the locking position. By moving the pin 106 slightly rearwardly, the notch no longer registers with the upper member 94 so that the pin 106 moves downwardly under the bias of the spring 114 to the locking position wherein it extends between the intermediate and lower members 96 and 98 to trap the pivot 32 within the slots 68. A handle 118 is fixed to the top of the pin 106 to prevent the pin from travelling downwardly within the members beyond the locking position and to provide a convenient grip for the operator for pulling the pin up to the release position for dismounting the attachment 50. The location of the pin 106 also assures that the operator has a clear view to determine easily if the pin is in the locked or unlocked position.

To automatically trip the pin 106 during mounting, an extension 120 is fixed to the lower end 34 of the boom arm 22 and supports an adjustable pin contacting member 122 which engages the top of the pin 106 as the attachment approaches the mounted position as shown in FIG. 6. The member 122 includes a bolt threaded into a nut fixed to the forward end of the extension 120. The position of the head of the bolt is adjusted (by turning the bolt in the nut) so that as the corresponding pivot 32 moves into the slots 68, the head moves the pin 106 rearwardly to disengage the notch from the member 96. The pin 106 then moves downwardly to the locking position to secure the pivot 32 within the slots 68.

Figure 7:
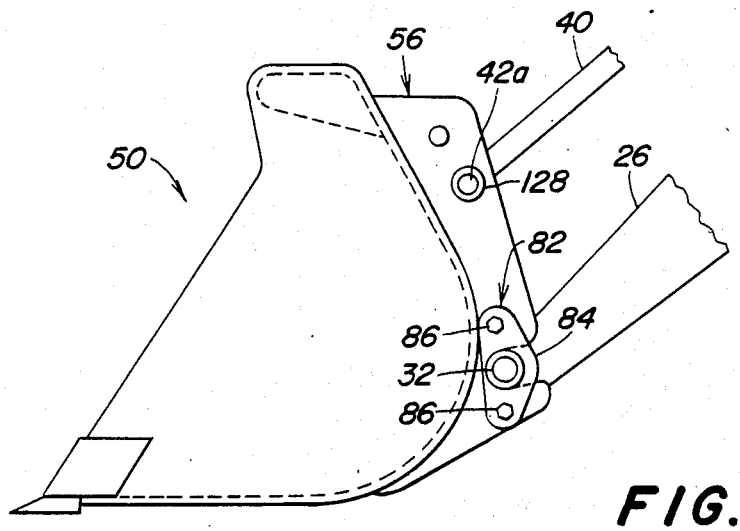
FIG. 7 is a view similar to FIG. 5 but showing the attachment with the semi-permanent mounting structure in place of the quick coupling.

Bushings 128 are located in the plates of the brackets 56 which align with the pivot location 42 when the attachment 50 is mounted. When the semi-permanent mounting arrangement of FIG. 7 is utilized, a longer pivot pin 42a is inserted which passes through the bushings 128 on the bracket 56 to connect the rod end of the cylinder 40 directly to the attachment 50.

The pin 64 positioned within the U-shaped support surface 66 provides good support for the attachment when the quick coupler arrangement of FIGS. 3–6 is utilized. Alternatively as shown in FIG. 7, securing structure 82 for more permanent mounting of the attachment includes mounting plates 84 connected by bolts 86 to the plates of the brackets 56. The plates 84 include apertures 88, and the extensions of the pivots 32 project through the apertures when the attachment is secured in the mounted position of FIG. 7. As is evident by comparing FIGS. 5 and 6 with FIG. 7, the locations of the pivots 32 and 42 (42a of FIG. 7) are identical for both the mountings 80 and 82 so that the operating dimensions and characteristics of the mounted attachment remain the same regardless of which mounting is selected.

FURTHER DESCRIPTION OF THE CARRIER 30

Figure 8:
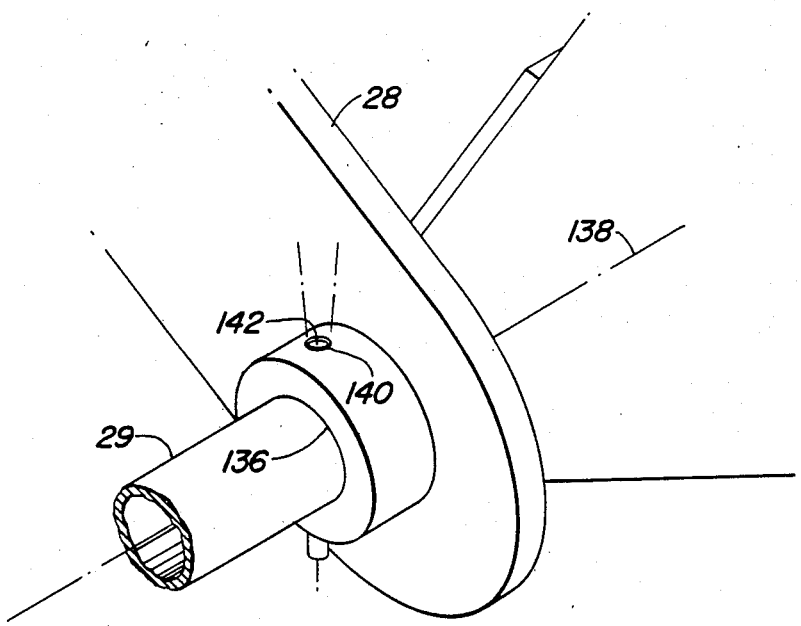
FIG. 8 is an enlarged perspective view of one side of the holder of FIG. 2 showing in detail the pin connection of the cross tube with the corresponding holder on that side.

The left-hand attachment holder end portion 28 is generally the mirror image of the right-hand end portion 28 (FIG. 8), and therefore only the right-hand portion will be described in detail here. As best seen in FIG. 8, the inner bushing 32 of the holder end portion 28 includes an inner bore 136 with an axis 138 located on the pivot center of the carrier 30. The diameter of the bore 136 is approximately equal to but slightly larger than the diameter of the semirigid cross tube 29, and the corresponding end of the tube 29 is positioned within the bore 136. The bushing 32 includes an aperture 140 for receiving a shear pin 142 which passes through mating holes in the hollow tube 29 to generally constrain the tube end for movement with the holder end portion 28 about the axis 138. The tube 29 is relatively small in cross section so that weight is minimized. The pin hole size is slightly larger than the shear pin size to permit limited relative rotation of the opposite end portions 28 without torquing the tube 29 to facilitate mounting of the attachment 50. Preferably the end portions 28 can freely rotate several degrees relative to each other before the tube 29 will begin to torque.

As can be appreciated from the above description, the axis of the tube 29 lies on the pivot center of the carrier 30 so that relative rotation between the end portions 28 beyond a preselected amount results in torquing of the tube 29 rather than in bending moments. Therefore, if for any reason excess force is applied to one side of the mounted attachment 50 (i.e., the attachment 50 catches on an obstruction), any deformation of the carrier 30 will result primarily in torque loads, rather than bending moments, being applied to the tube 29.

To protect the carrier 30, the shear pin 142 is selected such that it will break if the end portions 28 are rotated relative to each other more than a preselected amount. The shear pins 142 are removable so that the carrier 30 can be disassembled for repair or replacement of individual components, and for bundling of the components in a compact package for shipping. In addition, if the operator does not wish to utilize a quick attachment device (i.e., he normally maintains the loader 12 on the tractor 10), the quick coupling device 90 is removable so that he can connect the boom arm ends 26 and cylinders 40 directly to the attachment 50 as shown in FIG. 7.

OPERATION OF THE CARRIER

The carrier 30 is first assembled and connected to the lower ends of the arms 22. The cylinders 40 are connected to the upper locations 42 on the holder end portions 28. With the pins 106 moved upwardly to the unlocked positions, the driver moves the carrier 30 toward the attachment 50 (FIG. 3) and hooks the saddles 66 of the holder end portions 28 on the corresponding pins 64 (FIG. 4). If there is a misalignment of the carrier and attachment 50, the end portions 29 will rock relative to each other so that the saddles 66 can be properly positioned under the corresponding pins 64. The carrier 30 is then rolled back (FIG. 5) by retracting the cylinders 40 to move the bushings 32 into the slots 68. Just as the bushings 32 become fully seated in the slots, the head of the bolt trips the pin 106, locking the bushings 32 to the mounting brackets 56 and securing the attachment 50 to the boom in closely coupled fashion. To disconnect the attachment 50, the operator pulls the pins 106 to the unlocked position and extends the cylinders 40 to move the bushings 32 rearwardly away from the mounting brackets 56 (FIG. 4). Thereafter, he lowers the boom arms 22 and moves the carrier 30 rearwardly (FIG. 3) free of the attachment 50.

Having described the preferred embodiment, it will become apparent to one skilled in the art that various modifications may be made while not departing from the scope of the invention as defined in the claims which follow.

I claim:

1. In a loader having boom arms, connecting structure for mounting an attachment to the boom arms comprising:

first and second carrier end portions adapted for mating with corresponding receiving portions on the attachment;

means pivotally connecting the end portions to the boom arms for rocking with respect to the arms about a pivotal axis;

means for rocking the end portions about the axis;

a cross member extending between the end portions and means connecting the cross member to the end portions for generally constraining the end portions for rocking together about the axis while permitting limited rocking of the end portions relative to each other about the axis during mounting to facilitate connection of the attachment to the boom arms; and wherein the cross member comprises a semi-rigid tube having an axis which corresponds to the pivotal axis.

2. The invention as set forth in claim 1 wherein the means connecting the cross member includes a yieldable connection located between the end portions for preventing damage to the cross member when the end portions are rocked relative to each other beyond a preselected angular amount.

3. The invention as set forth in claim 1 including torque limiting means connected between the end portions for limiting the torque applied to the tube.

4. The invention as set forth in claim 3 wherein the torque limiting means comprises a shear pin connected between the tube and one of the end portions, wherein the shear pin facilitates relative rotation between the tube and the end portion of several degrees to provide said limited rocking of the end portions relative to each other.

5. In a loader having boom arms, connecting structure for mounting an attachment to the boom arms comprising:

first and second carrier end portions adapted for mating with corresponding receiving portions on the attachment;

means pivotally connecting the end portions to the boom arms for rocking with respect to the arms about a pivotal axis;

means for rocking the end portions about the axis;

a cross member extending between the end portions and means connecting the cross member to the end portions for generally constraining the end portions for rocking together about the axis while permitting limited rocking of the end portions relative to each other about the axis during mounting to facilitate connection of the attachment to the boom arms; and wherein the cross member comprises a unitary tube of circular cross section having an axis generally corresponding to the pivotal axis.

6. The invention as set forth in claim 5 including torque limiting means connected between the tube and at least one of the end portions for preventing damage to the tube when the end portions rock relative to each other beyond several degrees.

7. The invention as set forth in claim 6 wherein the means for preventing damage comprises a shear pin connecting the tube to said at least one of the end portions.

8. In a loader having boom arms, connecting structure for mounting an attachment to the boom arms comprising:

first and second carrier end portions adapted for mating with corresponding receiving portions on the attachment;

means pivotally connecting the end portions to the boom arms for rocking with respect to the arms about a pivotal axis;

means for rocking the end portions about the axis;

a cross member extending between the end portions and means connecting the cross member to the end portions for generally constraining the end portions for rocking together about the axis while permitting limited rocking of the end portions relative to each other about the axis during mounting to facilitate connection of the attachment to the boom arms; and wherein the end portions include inwardly projecting bushings and the means connecting the cross member to the end portions include means for releasably connecting the cross member to the bushings for selectively assembling and disassembling the end portions and the cross member.

9. The invention as set forth in claim 8 wherein the inwardly projecting bushings are adapted for receipt within the receiving portions of the attachment.

10. In a loader having boom arms, connecting structure for mounting an attachment to the boom arms comprising:

first and second upright carrier end portions adapted for mating with corresponding receiving portions on the attachment;

means pivotally connecting the lower ends of the end portions to the boom arms for rocking with respect to the arms about a pivotal axis;

means connected to the end portions above the axis for rocking the end portions about the axis;

an elongated tube extending between the end portions, the tube having an axis generally coinciding with the pivotal axis; and means connecting the end portions to the tube for generally constraining the end portions for rocking together about the axis while permitting limited rocking of the end portions relative to each other about the axis during mounting to facilitate connection of the attachment to the boom arms.

11. The invention as set forth in claim 10 wherein the means connecting the end portions to the tube includes a yieldable connection for preventing damage to the tube when the end portions are rocked relative to each other beyond a preselected angular amount.

12. The invention as set forth in claim 10 wherein the means for connecting the end portions to the tube includes pin means insertable in and removable from the end portions and the tube for selectively connecting and disconnecting the end portions to and from the tube to facilitate handling of the connecting structure when dismounted from the boom arms.

13. The invention as set forth in claim 10 wherein the means for generally constraining comprises a pin connection located between the end of the tube and the corresponding end portion, said pin connection having a preselected amount of play to facilitate at least several degrees of free rotation of the end portions with respect to each other.

14. In a loader having boom arms, connecting structure for mounting an attachment on the boom arms comprising:

first and second carrier end portions adapted for mating with corresponding receiving portions on the attachment;

means pivotally connecting the end portions to the boom arms for rocking with respect to the arms about a pivotal axis;

cylinder means for rocking the end portions about the axis;

a cross member comprising a tube extending between the end portions and having an axis corresponding generally to the pivotal axis; and means pivotally connecting the end portions to the cross member for facilitating limited rocking of the end portions relative to each other about the axis during mounting to accommodate misalignment of the attachment relative to the end portions.

15. The invention as set forth in claim 14 wherein the cross member consists of a single tube, the means pivotally connecting the end portions to the cross member includes pin means connecting the ends of the tube to the corresponding end portions, and the pin means constrains the tube ends for rocking with the end portions about the axis as the end portions rock relative to each other beyond a preselected amount.

16. The invention as set forth in claim 15 wherein the pin means includes a shear pin for limiting the torque applied to the tube as the end portions rock beyond said preselected amount.

17. The invention as set forth in claim 16 wherein the shear pin is connected between the tube and one of the end portions and facilitates relative rotation between the tube and the end portion of at least approximately two degrees to provide said limited rocking of the end portions relative to each other.

18. The invention as set forth in claim 14 wherein the means pivotally connecting the end portions to the boom arms include a pivot extending from the arms, wherein the end portions are selectively removable from the boom arms, and the connecting structure further comprises securing structure connected to the receiving portions and pivotally securing the pivot directly to the receiving portions for rocking about an attachment axis when the carrier portions are removed.

19. The invention as set forth in claim 18 wherein the attachment axis coincides with the pivotal axis.

* * * * *